(12) United States Patent
Derrig et al.

(10) Patent No.: US 8,858,146 B1
(45) Date of Patent: Oct. 14, 2014

(54) INSULATED SUPPORT FOR ELECTRIC CONDUCTORS, FINGER GRIP, AND METHOD OF MAKING SAME

(76) Inventors: Dale Derrig, Greenfield, MA (US); Jeffrey Roy, Greenfield, MA (US)

( * ) Notice: Subject to any disclaimer, the term of this patent is extended or adjusted under 35 U.S.C. 154(b) by 118 days.

(21) Appl. No.: 13/566,744

(22) Filed: Aug. 3, 2012

Related U.S. Application Data

(63) Continuation-in-part of application No. 12/906,725, filed on Oct. 18, 2010, now Pat. No. 8,303,226.

(51) Int. Cl.
*F16B 15/00* (2006.01)

(52) U.S. Cl.
USPC ................................ 411/457; 411/469; 81/44

(58) Field of Classification Search
USPC ................ 411/457, 469, 475; D8/390; 81/44; 40/669
See application file for complete search history.

(56) References Cited

U.S. PATENT DOCUMENTS

| | | | | | |
|---|---|---|---|---|---|
| 249,851 | A | * | 11/1881 | McGill | 40/669 |
| 915,054 | A | * | 3/1909 | Hall | 40/669 |
| 1,725,603 | A | * | 8/1929 | Tarr | 40/669 |
| 1,923,602 | A | * | 8/1933 | Weiss | 40/669 |
| 2,252,384 | A | * | 8/1941 | Marsh | 40/669 |
| 2,271,841 | A | * | 2/1942 | Kohnle | 40/669 |
| 2,298,705 | A | * | 10/1942 | Kohnle | 40/669 |
| 4,966,056 | A | * | 10/1990 | Miller | 81/44 |
| 5,314,160 | A | * | 5/1994 | Larsen | 248/547 |
| 5,933,894 | A | * | 8/1999 | Bates | 7/164 |
| 5,957,007 | A | * | 9/1999 | Righini | 81/44 |

* cited by examiner

*Primary Examiner* — Gary Estremsky
(74) *Attorney, Agent, or Firm* — Luis Figarella

(57) ABSTRACT

A manufacturing method and device for supporting conductors. Using a non-metallic insulating material extending beyond the inside of one or both parallel legs of a staple the thumb and forefinger may grip this extension while the staple is being driven into a supporting structure. This finger grip allows for a small, insulated staple to be held with increased safety to thumb and forefinger during penetration of staple into support.

4 Claims, 16 Drawing Sheets

(Front elevation view)

(Right side elevation view)

7. Staple  2.  1. Finger grip (Top plan view)

10. Staple leg  2. Non-metallic insulating material (Bottom plan view)

2. Non-metallic insulating material
10. Staple leg
10. Staple leg (Left side elevation view)

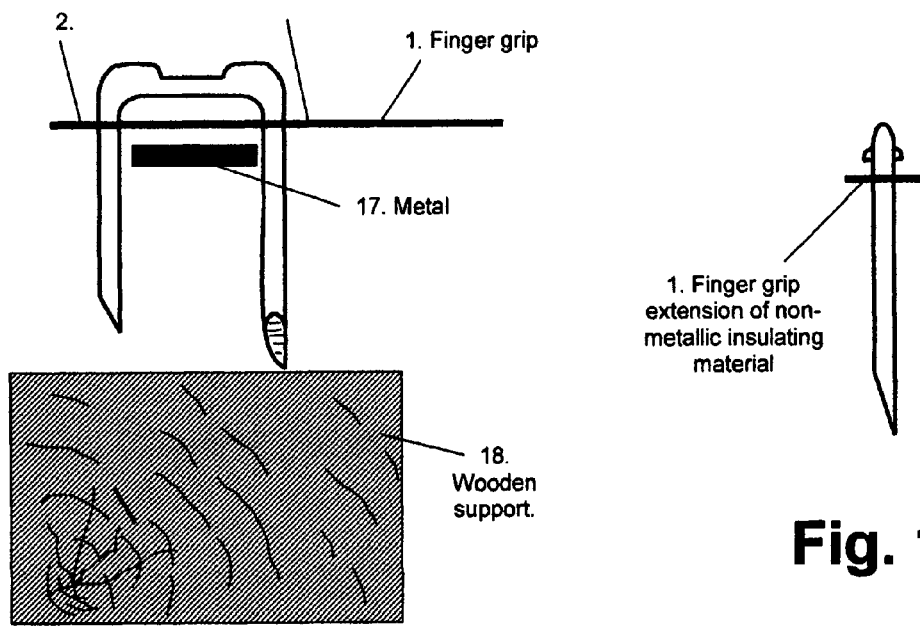
Fig. 8
Fig. 9
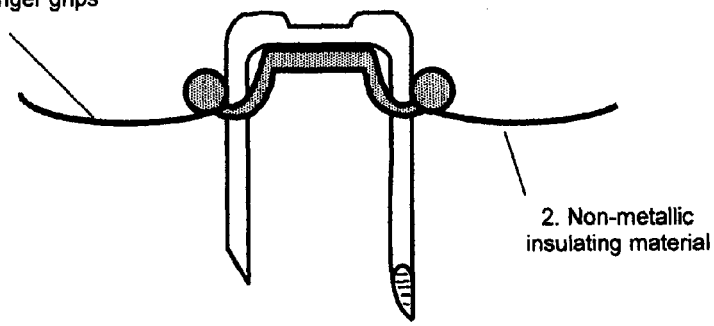
Fig. 10

4. Finger grip perforation of non-metallic insulating material (for removal of finger grip)

(Insulating staple holding captured insulated wires)

(Insulating staple holding captured insulated wires with finger grip removed)

Side plan view of multiple staple unit strip ( 9.)

(Front elevation view)

(Front elevation view)

(Right side elevation view)

(Side elevation view)

(Bottom plan view)

(Bottom plan view)

10. Staple leg (Side elevation view)

(Bottom plan view)

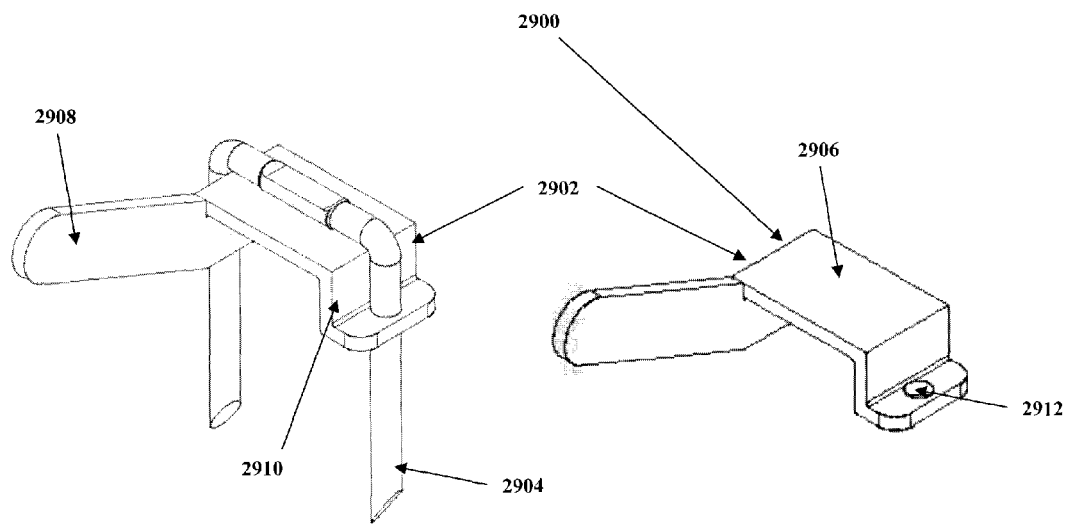
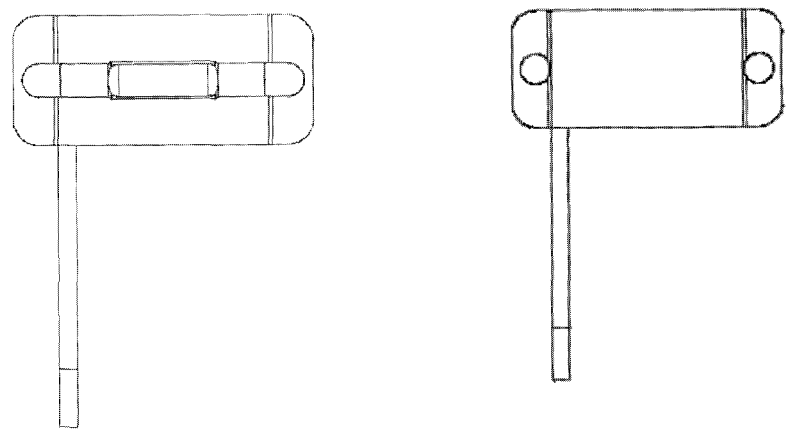
Figure 29A  Figure 29B
Figure 29C  Figure 29D

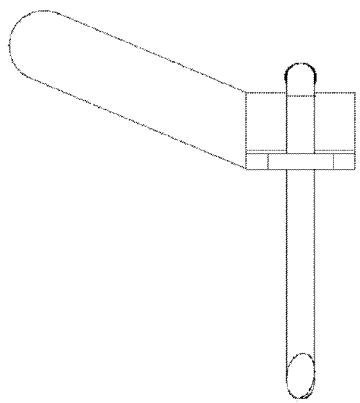
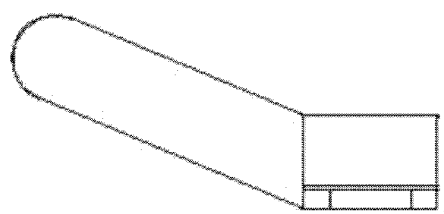
Figure 29E
Figure 29F
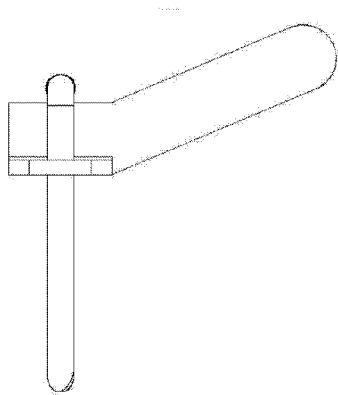
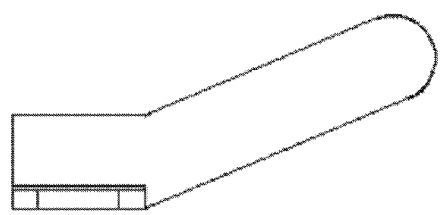
Figure 29G
Figure 29H

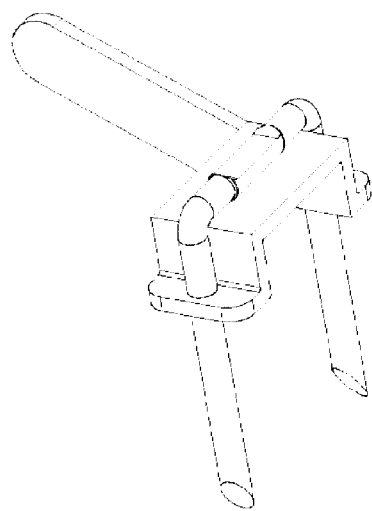
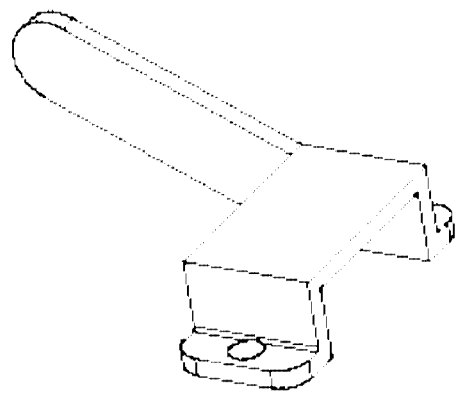
Figure 29I
Figure 29J
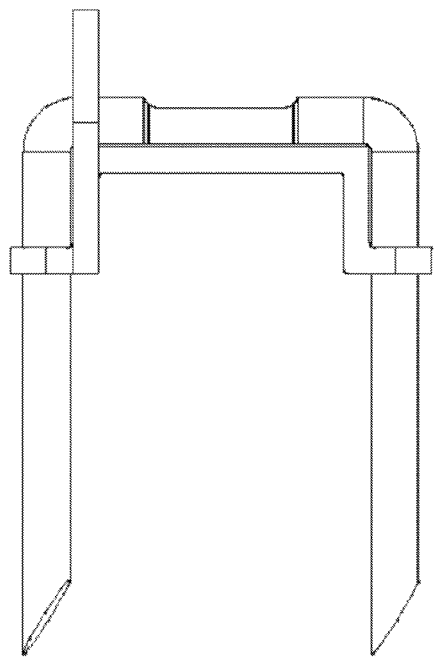
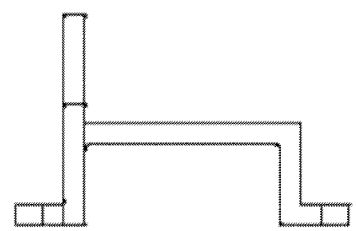
Figure 29K
Figure 29L

INSULATED SUPPORT FOR ELECTRIC CONDUCTORS, FINGER GRIP, AND METHOD OF MAKING SAME

CROSS-REFERENCE TO RELATED APPLICATIONS

This application is a continuation-in-part of pending of U.S. patent application Ser. No. 12/906,725 titled "Insulated support for electric conductors, finger grip, and method of making same", filed on Oct. 18, 2010, the disclosure of which is incorporated herein by reference in its entirety.

TECHNICAL FIELD

The present invention relates to an insulated staple that can be more safely held, in a specific position, during staple attachment and penetration into a supporting structure. The present invention also relates to a method for manufacturing this insulating staple.

BACKGROUND

An insulated staple is generally of a V-shaped configuration with a non-metallic insulating strip of material that is in contact with an insulated conductor, conduit, water pipe or tubular material containing fiber optic lines that transfer electronic data. The most common purpose of this device is to attach an electrical conductor to a non-conducting supporting structure. Historically, an insulating staple is used to attach electrical wiring to the walls of a building. During this simple process of attaching a conducting wire with an insulated staple to a wall or stud the person driving the staple into supporting structure will occasionally smash his or her finger with a hammer. If using an insulated staple to attach different conductors or electronic components to manufacture an electronic device there is little room for holding the staple so that one might carefully view how far to push the staple into the supporting structure.

With this invention, the insulating strip of material bridges the section of the staple body member and extends beyond one or both staple legs to allow for gripping and holding the staple, via the insulating strip, with thumb and forefinger. By positioning the staple with one's fingers away from the head of the staple during penetration into a support a construction worker or electrician or electronics technician will be more clearly able to see the staple and to also see more clearly what the staple is holding for attachment into a supporting structure. In all cases positioning the staple with one's fingers away from the head of the staple during penetration with a hammer or driving device will result in fewer injuries to those fingers holding the staple.

U-shaped insulated staples for mounting conduits such as electrical conductors or conduits to support objects are well known in the art as indicated by U.S. Pats. Nos. 662,587; 843,916; 2,351,608; 2,526,902; 3,154,999; 3,176,945; 3,894,174; 3,940,844; 4,697,045; Des. 298,916; and Des. 330,699. In a typical installation where such staples are employed, the elongated conductor is held in place by the component parts of the staple comprising a bridging section interconnecting two generally opposed and parallel legs straddling the conductor.

The parallel legs have pointed, free ends, which are driven into the supporting, object by a hammer or other tool. The bridging section of the U-shaped staple is frequently lined or covered with an insulating material so that the electrical conductor, conduit, cable or other device being anchored is held in isolated relationship from the staple. In this respect, the use of the terms "insulated," "insulating" or "insulation" in this specification is intended to encompass electrical, thermal, and vibration insulating characteristics, all of which can be advantageously employed between mounting an insulated staple and a supported electrical conductor, cable or conduit.

In the prior art staples exemplified in the above-referenced patents, the U-shaped body member is formed from a relatively hard material, most commonly a metal, in order to withstand the blows of a hammer as the staple is driven into a supporting base. Since most metals are good electrical and thermal conductors and, by their inherent hardness, tend to transmit vibratory forces with little attenuation to the supported conduit, it is common to provide insulation about the bridging section and contiguous portions of the parallel legs of the body member by coating or mounting an insulating material on the body member to separate the conduit and body member in the mounted positions.

In U.S. Pats. Nos. 662,587; 843,916; 2,351,608; 3,176,945; 4,697,045; Des. 298,916; ad Des. 330,699 the insulator is formed from a strip of insulating material and is held to the body member by frictional engagement of the legs. In U.S. Pats. Nos. 2,526,902; 3,154,999; 3,894,174; and 3,940,844 the insulating material is applied to the staple as a close-fitting covering preferably applied by a molding operation with a special molding die of suitable construction. In U.S. Pats. Nos. 249,851; 330,444; 1,833,786; 2,632,346 there are no insulators added to the staple. In U.S. Pats. Nos. 100,055; 274,481; 667,700; 712,245; 1,051,212; 1,103,444; 1,112,849; 1,310,908; and 1,737,206 there are no insulators added to the barbed staple or spike.

In each of the above-referenced prior art staples, the staple is held most often by one or both legs of the staple with the thumb and forefinger when the staple is driven into a support structure with a hammer. While the end products are suitable for their intended purposes, there is little doubt that over the last 100 years many a thumb and forefinger have been injured with a hammer or mallet during the act of driving a staple into supporting wood. Although painful, it is most often the case in the electrical and building trades that a finger is injured only slightly. However, it is not uncommon to loose a fingernail or incur an injury that is more serious.

An injury that is much more serious than loosing a fingernail, caused by blunt trauma, such as hitting the end of your finger or fingers with a hammer, is called "Mallet Finger." It is inventors' understanding that the origin of the name "Mallet finger" comes from a finger being injured by being struck with a mallet. Mallet finger injury usually represents mechanical failure of the terminal digital extensor mechanism, either from tendon disruption or fracture of the most distal interphalangeal joint of a finger. In the building and construction trades, mallet finger most commonly involves the forefinger of the hand opposite the hand holding a hammer. Mallet finger injuries may be classified as follows:

Closed tendon rupture
Laceration with or without joint surface injury
Abrasion with tissue loss
A fracture of the most distal interphalangeal (finger) joint with sub classification of this joint also defined as being sub-luxated or not being sub-luxated Treatment is individualized and involves either conservative treatment with continuous extension splinting or surgical repair and pinning of the injured joint. Splinting must be continuous to be effective. Surgery has risks of infection, hardware problems, stiffness, wound healing problems and technical failure, among other possible complications.

Regardless of treatment, some permanent visible loss of both flexion and extension is expected within the finger and injured joint.

Persistent deformity is more likely to be obvious in fingers with hyper extensible proximal interphalangeal joints or absent a superficial tendon. Despite this, functional recovery is usually satisfactory and an electrician or laborer can usually return to work within a few weeks following injury. Without treatment a deformity, created over roughly three months of continued use of the injured finger will result in excess growth of subcutaneous tissue around the most distal interphalangeal joint (the last joint in a finger and just above the finger nail). Rest is important and work involving the injured joint is unlikely to improve with splinting alone. No current treatment can be expected to improve active range of motion for a chronic deformity, and treatment options are generally limited to joint fusion, tenodermodesis, or doing nothing further.

In each of the above-referenced prior art examples of staples, the thumb and forefinger hold a staple by a leg or legs while the staple is "set" and driven into a supporting structure, most often by hitting the head of the staple with a hammer. While the end products of prior art are suitable for their intended purposes, the safety issue of hitting a finger has always been a concern. Those individuals not used to handling a hammer may use a tool, such as a round nose or needle nosed pliers, to hold a staple while being driven into a supporting structure. However, this is not a practical solution for an electrical or labor contractor who needs a job done as safely, efficiently and quickly as possible.

To maintain an efficient time line for construction schedules and also reduce the injury rates of construction labor, inventors disclose a staple which is simple in construction and which can be easily assembled from readily available insulating material having a multitude of other purposes. The significant embodiment of this novel insulated staple is that a finger grip extends from the staple so that the thumb and forefinger are just far enough away from the head of the staple to avoid injury during the act of driving the staple with a hammer yet close enough to provide stability of staple positioning.

Upon review of prior art it is obvious that a long-standing need has existed to provide a novel staple wherein the thumb and forefinger are less likely to be injured with a hammer or mallet. Inventors teach the present invention relates to both a safer to install insulated staple and the method for making such a staple.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

In one aspect the invention is about an insulating device for securing conductors comprising a staple with a metallic body having a plurality of leg portions connected by a bridge portion, an elongated single-thickness strip of material pierced by at least one leg of said staple, said strip of material encircling at least one of the upper parts of the staple leg and spanning the inner section of the staple bridge, said strip of material being aligned with the staple bridge and one or more tabs extending from within the portion of said strip of material located within said staple bridge portion, said tab extending beyond the arch of the staple by a distance longer than half the staple bridge span.

In another aspect, said strip of material is comprised of plastic. In yet another aspect, the invention is about a method for creating a device for securing conductors comprising providing a staple with a metallic body having a plurality of leg portions connected by a bridge portion, providing an elongated single-thickness strip of material pierced by at least one leg of said staple, said strip of material having one or more tabs extending from within the portion of said strip of material located within said staple bridge portion, said tab extending beyond the arch of the staple by a distance longer than half the staple bridge span, placing said strip of material so that it encircles at least one of the upper parts of the staple leg and spans the inner section of the staple bridge and aligning said strip of material with the said staple bridge. In another aspect said strip of material is comprised of plastic.

A finger grip allows a small, insulated staple to be held with increased safety to thumb and forefinger during penetration of a staple into a supporting structure. Also, by positioning the staple with one's fingers away from the head of the staple during penetration into a supporting structure a construction worker or electrician or electronics technician will be more clearly able to see the staple and to also see more clearly what the staple is holding for attachment into a supporting structure.

Other features and advantages of the present invention will become apparent upon examining the following detailed description of an embodiment thereof, taken in conjunction with the attached drawings.

BRIEF DESCRIPTION OF THE DRAWINGS

FIG. 8 Front elevation view of embodiment showing multiple finger grips, according to an illustrative embodiment of the invention.

FIG. 9 Front elevation view of embodiment showing ornamental variation of insulating non-metallic material comprising both material design within the staple body bridging component and the finger grip, according to an illustrative embodiment of the invention.

FIG. 10 Right side elevation view of embodiment showing ornamental variation of nonmetallic insulating material as a finger grip extension, according to an illustrative embodiment of the invention.

FIGS. 29A-29M illustrate a complete finger grip with and without a staple, according to an illustrative embodiment of the invention.

DETAILED DESCRIPTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Figure 1:
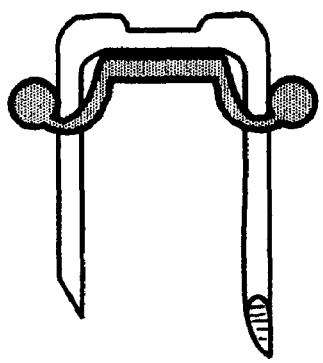
FIG. 1 Front elevation view of insulated staple as illustrated in US Design Pat. 330,699.
Figure 2:
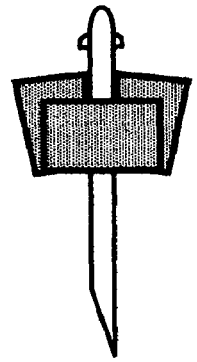
FIG. 2 Right side elevation view of insulated staple as illustrated in US Design Pat. 330,699.

Referring to FIGS. 1 and 2, a commonly used insulated staple is illustrated showing US Design Patent No. 330,699 and, by comparison, the novel invention taught by inventors in FIGS. 3, 4, 5, 6, 7, 8, 9, 10, 11, 12, 13, 14, 15, 16, 17, 18, 19 and 20.

Figure 3:
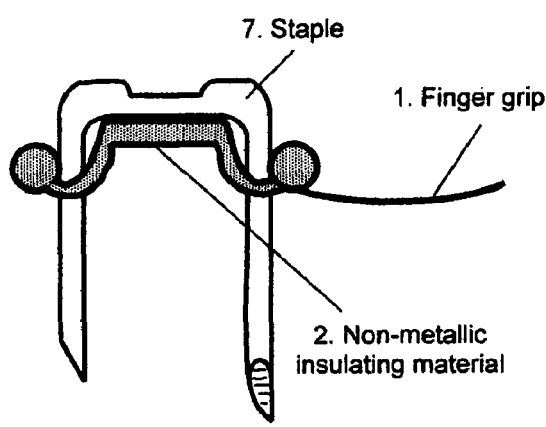
FIG. 3 Front elevation view of preferred embodiment incorporating the present invention, according to an illustrative embodiment of the invention.

Referring to FIG. 3, the primary and most novel feature of the present invention resides in the provision of a finger grip as indicated by numeral 1. The finger grip is of the same non-metallic insulating material 2 as the insulating means of the staple and manufactured by extending this material to one side of the staple for the purpose of holding more safely an insulated staple by the thumb and forefinger during placement and penetration of the staple into a supporting object. The finger grip perforation 4 is also shown.

The U-shaped staple body member is formed from a metallic wire stock; and the non-metallic insulated material is formed from an electrically nonconductive plastic. The non-metallic insulated material is formed in a shape bridging the section of the staple body member that conforms to the general shape of a captured object on penetration of staple into a supporting base with said shape of non-metallic insulated material having an extension of a finger grip.

In this respect, the use of the terms "insulated," "insulating" or "insulation" in this specification is intended to encompass electrical, thermal, and vibrational insulating characteristics, all of which can be advantageously employed between mounting an insulated staple and a supported electrical conductor, cable or conduit.

Figure 4:
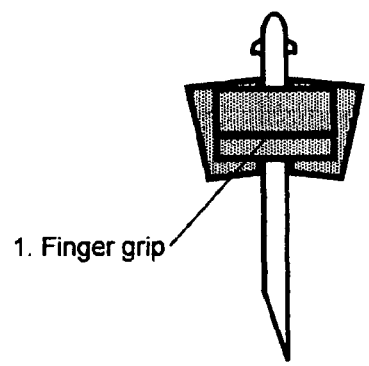
FIG. 4 Right side elevation view of preferred embodiment incorporating the present invention, according to an illustrative embodiment of the invention.

Referring to FIG. 4, a right side elevation view of the preferred embodiment illustrates the provision of the relative finger grip 1 position.

Figure 5:
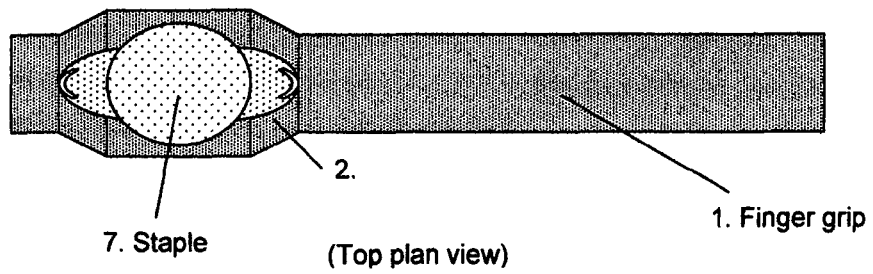
FIG. 5 Top plan view of preferred embodiment incorporating the present invention, according to an illustrative embodiment of the invention.

Referring to FIG. 5, a top plan view of the novel invention's preferred embodiment illustrating the relative placement of the staple body member 7 within the non-metallic insulating material 2 and relative length and location of the finger grip 1.

Figure 6:
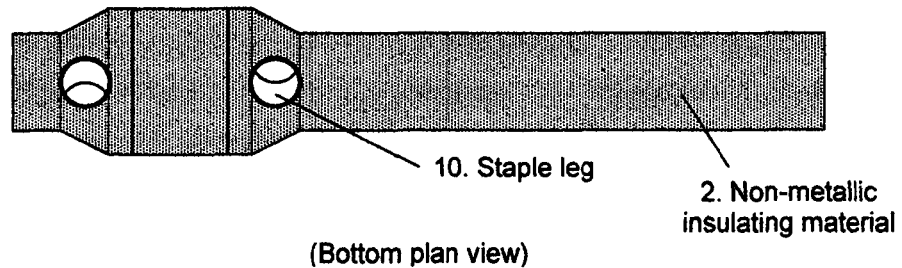
FIG. 6 Bottom plan view of preferred embodiment incorporating the present invention, according to an illustrative embodiment of the invention.

Referring to FIG. 6, a bottom plan view of the novel preferred embodiment illustrating the relative placement of the generally parallel staple legs 10, each pointed, and piercing the non-metallic insulating material 2.

Figure 7:
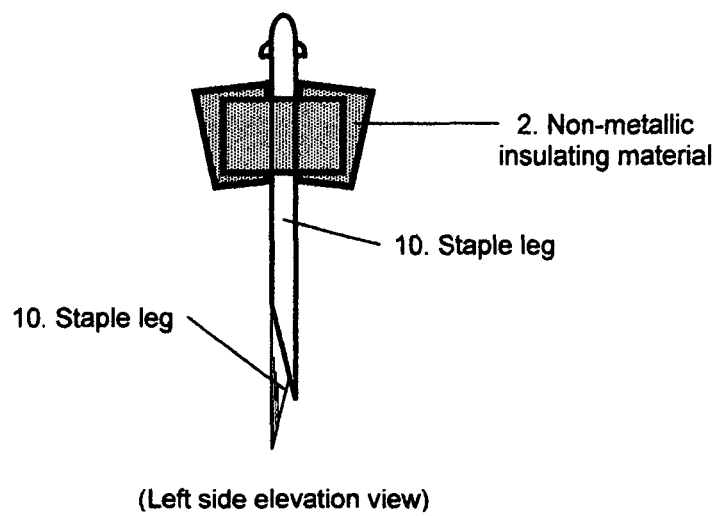
FIG. 7 Left side elevation view of preferred embodiment incorporating the present invention, according to an illustrative embodiment of the invention.

Referring to FIG. 7, a left side elevation view illustrating staple legs 10 and location of the non-metallic insulating material 2.

Referring to FIG. 8, a front elevation view of another preferred embodiment illustrating the provision of multiple finger grips 3 and their relative positions in relationship to the staple body and that these multiple finger grips 3 are merely extensions on both sides of the staple body of the non-metallic insulating material 2.

Referring to FIG. 9, the insulating non-metallic material may be of a variety of Ornamental variation of insulating non-metallic material or ornamental configurations 11, depending upon the physical property or properties of that component needed to be captured and anchored to a supporting structure. This illustration of another preferred embodiment indicates a finger grip 1 for one of these ornamental configurations of non-metallic insulating material 2 in which a flat component, such as a flat strip of metal 17, will be anchored to a supporting structure of wood 18 for reasons of reducing vibration.

Figure 11:
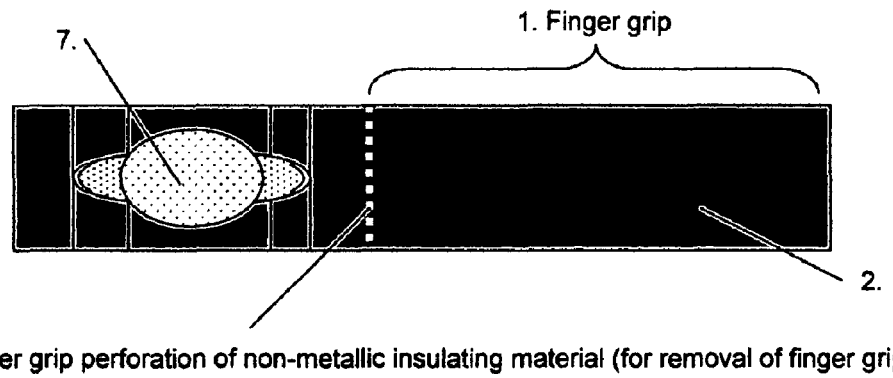
FIG. 11 Top plan view of inventors' embodiment showing an ornamental variation, according to an illustrative embodiment of the invention.

Referring to FIG. 10, an illustration of a view of either side of the ornamental configuration shown in FIG. 9 in which the finger grip 1 extension is identified. As illustrated in FIG. 10, wherein the non-metallic insulating material of both finger grip and material bridging the staple body member being the same width and thickness and axis being of the same general horizontal plain, finger grip perforations within the nonmetallic insulating material being used for the removal of the finger grip following the penetration of the insulated staple into a supporting structure;

Referring to FIG. 11, a top plan view of this preferred embodiment illustrates the relative placement of the staple body member 7 within the non-metallic insulating material 2, relative length and location of the finger grip 1 and a perforation for the finger grip 4. This perforation is for removing the finger grip following penetration of the insulating staple into a support, as is illustrated in FIG. 13.

Figure 12:
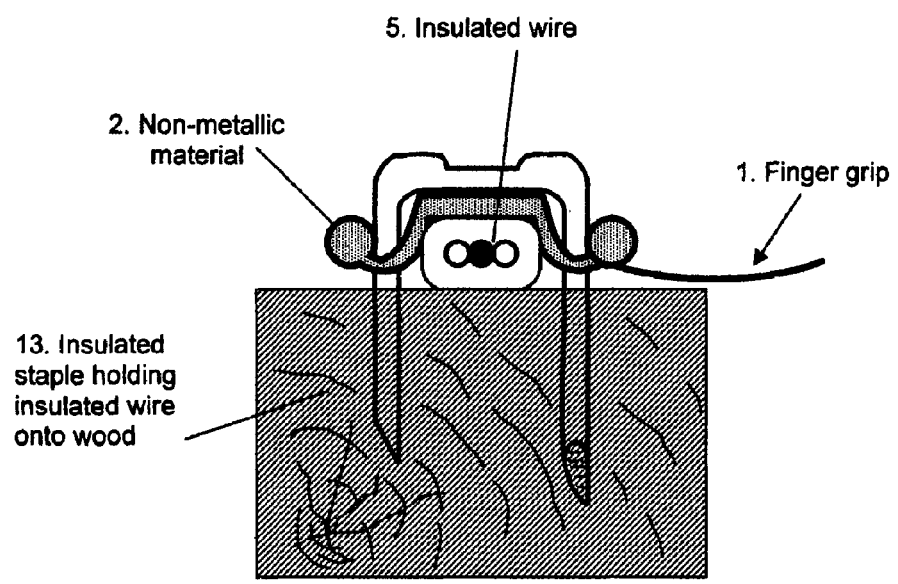
FIG. 12 Front elevation view of preferred embodiment showing novel insulating staple holding captured insulated wires, according to an illustrative embodiment of the invention.

Referring to FIG. 12, an illustration of the insulating staple holding captured insulated wires within a wooden support 13, the insulated wire(s) 5 (in this illustration what is captured by the staple and held to the wood is commonly known as a "Romex" conductor), and the location of the finger grip 1 that is still attached to the non-metallic insulated material 2 of the insulated staple.

Figure 13:
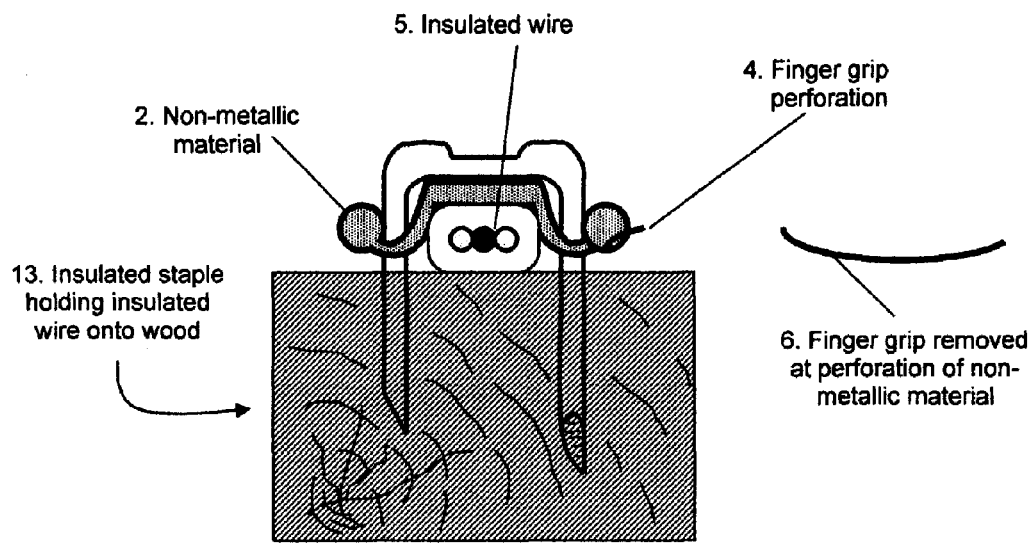
FIG. 13 Front elevation view of preferred embodiment showing novel insulating staple holding captured insulated wires with finger grip removed, according to an illustrative embodiment of the invention.

Referring to FIG. 13, an illustration of the insulating staple holding captured insulated wires within a wooden support 13, the insulated wire(s) 5 being captured and securely held, the location of the now unattached finger-grip-perforation 4 within the non-metallic insulated material 2 of the embedded insulated staple, and the finger grip removed 6 at the now unattached perforation of the non-metallic insulating material. An insulated barbed staple 14 is shown.

Figure 14:
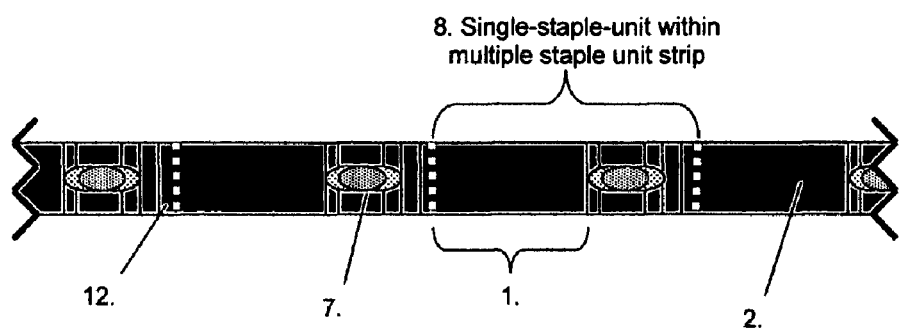
FIG. 14 Top plan general view of multiple staple unit strip showing location of perforation of non-metallic insulating material used to separate single-staple-unit from multiple staple unit strip, according to an illustrative embodiment of the invention.

Referring to FIG. 14, an illustration of the top plan general view of another preferred embodiment showing a multiple staple unit strip 9 and illustrating the relative location of the single-staple-unit-perforation 12 (for removing single staple unit from multiple staple unit strip) within the non-metallic insulating material 2 used to separate a single staple unit within multiple staple strip 8 from the multiple staple unit strip 9. Also illustrated are the relative locations of the staple body member 7 and relative length of finger grip 1 within the strip.

Figure 15:
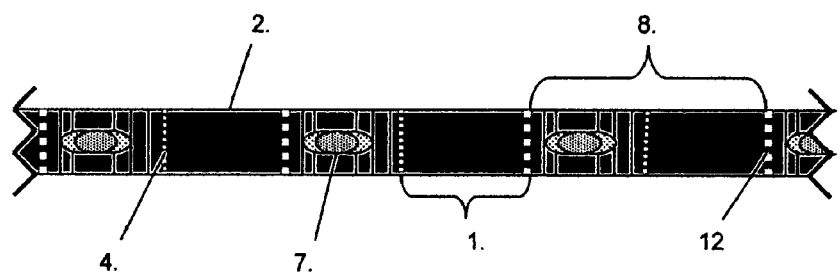
FIG. 15 Top plan view of multi-perforated multiple staple unit strip showing location of perforation of non-metallic insulating material used to separate single-staple-unit from multiple staple unit strip and second perforation used to remove finger grip once staple has been driven into supportive structure, according to an illustrative embodiment of the invention.

Referring to FIG. 15, an illustration of the top plan view of another preferred embodiment showing a multi-perforated multiple staple unit strip 17 showing the relative location of the single-staple-unit-perforation 12, within the non-metallic insulating material 2 that is used to separate the single staple unit 8 from multiple staple unit strip 9. A second perforation within this multiple staple unit strip 9 is illustrated as the finger grip perforation 4 and is used to remove the finger grip once the staple has been driven into a supportive structure. A leg barb 15 is shown.

Figure 16:
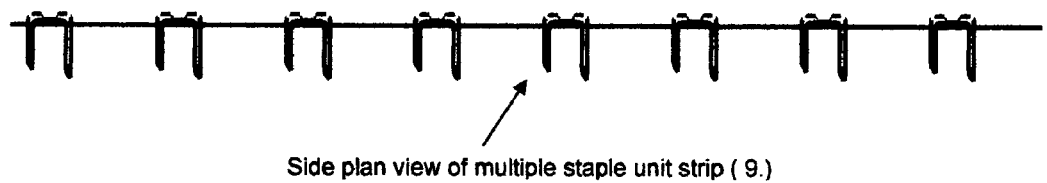
FIG. 16 Side plan view of multiple staple unit strip, according to an illustrative embodiment of the invention.

Referring to FIG. 16, an illustration of the side plan view of a multiple staple unit strip 9. Top plan view of multi-perforated multiple staple unit strip showing perforations of non-metallic insulating material with 90-degree twist of non-metallic material for finger grip.

Figure 17:
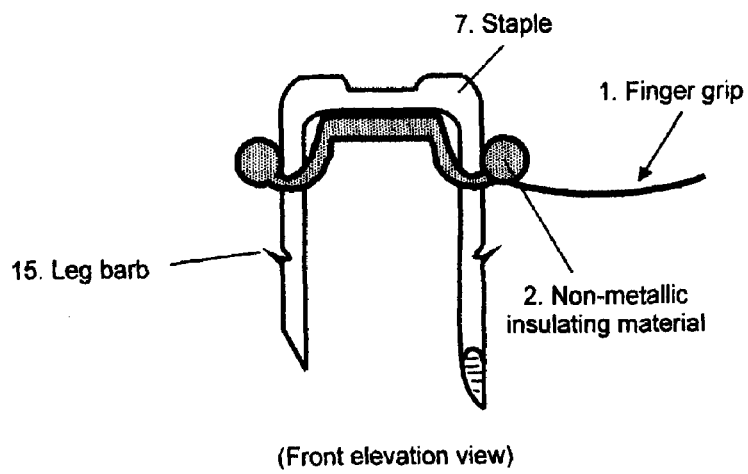
FIG. 17 Front elevation view of embodiment incorporating a barbed staple of the novel present invention, according to an illustrative embodiment of the invention.

Referring to FIG. 17, an illustration of the front elevation view of a leg barb 15 of an insulated barbed staple showing the relative locations of the leg barb(s) upon the staple body member 7, the finger grip 1, and non-metallic insulating material 2. Top plan view of multi-perforated multiple staple unit strip showing location of perforation of non-metallic insulating material used to separate single staple unit from multiple staple unit strip and second perforation used to remove finger grip once staple has been driven into supportive structure.

Figure 18:
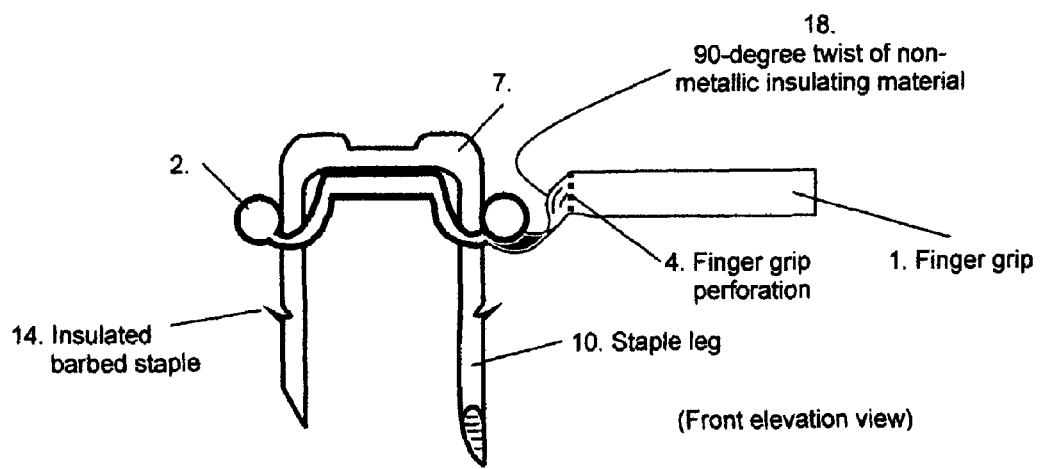
FIG. 18 Front elevation view of embodiment incorporating a 90-degree twist in orientation of the finger grip, according to an illustrative embodiment of the invention.

Referring to FIG. 18, an illustration of the front elevation view of another preferred embodiment where the non-metallic insulating material 2 has been manufactured to be 90-degree twist of non-metallic material 18 to the horizontal plane of the non-metallic insulating material and parallel with the general vertical plane of the parallel staple legs 10. The 90 degree twist of the non-metallic insulating material is at or near the location of the finger grip perforation 4 so that the finger grip 1 may be held with the thumb and forefinger at 90 degrees as to be similar to the vertical plane of the staple legs.

In this manner a thumb and forefinger fingernail is less likely to be injured due to being at a 90 degree angle from the downward movement of a hammer or mallet, as well as being at a safer distance from a staple body member 7. In this illustration an insulated barbed staple 14 is shown, but is understood by inventors that this embodiment may include any barbed or un-barbed insulated staple, any degree of twist of the non-metallic insulating material, or that any angle of the non-metallic insulating material forming the finger grip 1 may be manufactured and bent for greater ease of holding the staple member with the thumb and forefinger during positioning for driving the insulated staple into a supporting member.

Figure 19:
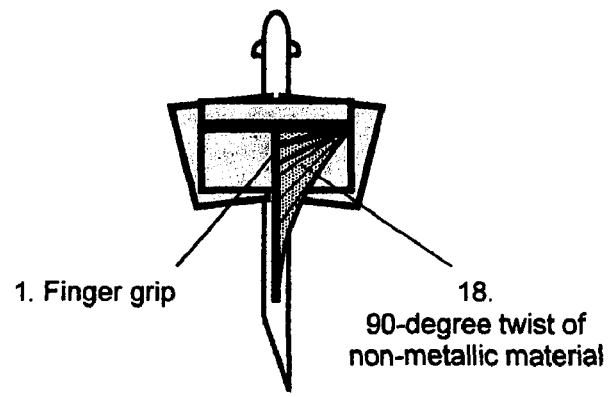
FIG. 19 Right side elevation view of embodiment incorporating a 90-degree twist in orientation of the finger grip, according to an illustrative embodiment of the invention.

Referring to FIG. 19, an illustration of the right side elevation view of FIG. 18 showing the relative location and placement of the twisted finger grip 1 and 90-degree twist of non-metallic material 18. Ornamental variation 19 of finger grip insulating non-metallic material with any bend of 45 degrees to nearly a right angle to bridging body member of insulating non-metallic material staple.

Figure 20:
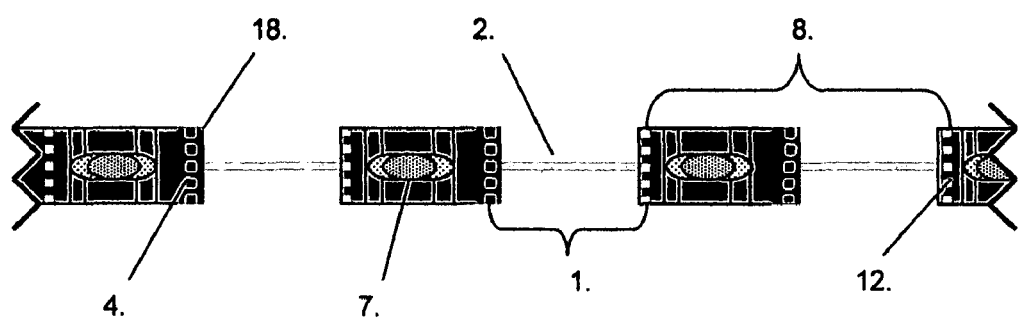
FIG. 20 Top plan view of multi-perforated multiple staple unit strip showing perforations of non-metallic insulating material with 90-degree twist of non-metallic material for finger grip, according to an illustrative embodiment of the invention.

Referring to FIG. 20, an illustration of the top plan view of another preferred embodiment where a multi-perforated multiple staple unit strip showing the relative location of the finger grip perforation 4, relative location of single staple unit 8, relative location of single-staple-unit-perforation 12 within multiple staple unit strip, relative location of 90 deg. twist of non-metallic material 18, the relative length and location of a single-staple-unit finger grip 1 that has been twisted 90-degrees to the plane of the remaining non-metallic insulating material 2, and relative location of staple body member 7 within the multiple staple unit strip.

Figure 21:
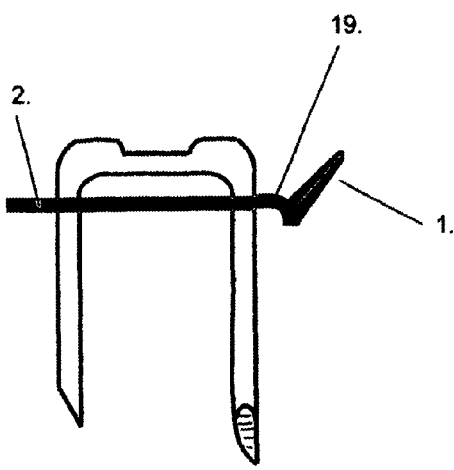
FIG. 21 Top plan oblique view illustrating an ornamental variation of the finger grip with a bend of nearly a right angle outside of the staple leg, according to an illustrative embodiment of the invention.

Referring to FIG. 21, an illustration of an ornamental variation of the angle or bend of the non-metallic insulating material 2 forming a finger grip 1. In this illustration this embodiment variation illustrates a nearly right angle 19 bending of the non-metallic insulating material to the horizontal plane of the bridging body member of same insulating non-metallic material penetrated by both staple legs.

Figure 22:
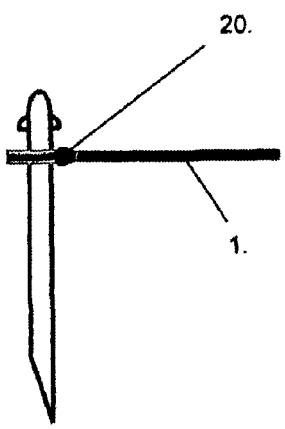
FIG. 22 Side elevation view illustrating an ornamental variation of the finger grip with a right angle bend beginning at a point greater than 1/16th inch from outside of staple leg, according to an illustrative embodiment of the invention.

Referring to FIG. 22, an illustration of another preferred embodiment where an ornamental variation of the finger grip 1 shows this finger grip begins with a right angle bend at a point greater than ¹⁄₁₆th inch from the outside surface 20 of the staple leg (Ornamental variation of finger grip insulating non-metallic material with right angle bend beginning at point greater than ¹⁄₁₆th inch from outside of staple leg). Compared with FIG. 4 and FIG. 10 one skilled in the art can see the different location of the finger grip 1 and that this embodiment variation of the angle and location of this finger grip is a novel inventive step of this invention.

Figure 23:
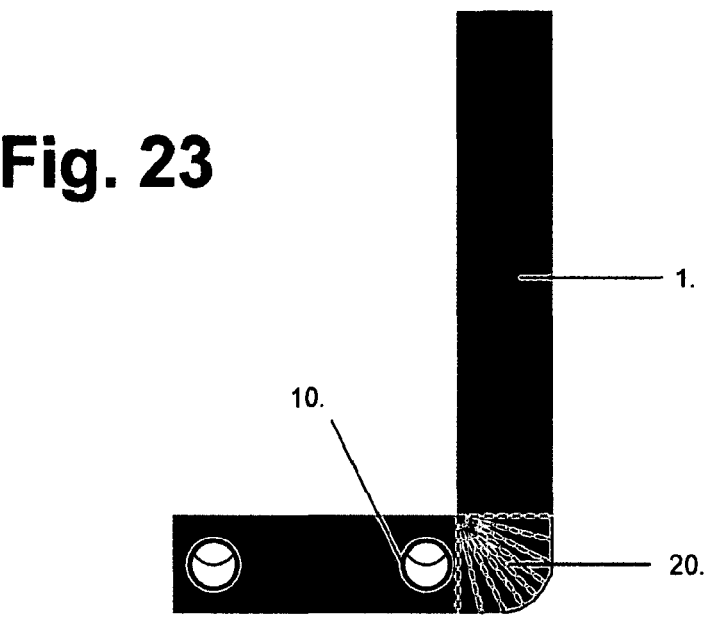
FIG. 23 Bottom plan view illustrating an ornamental variation of the finger grip with a right angle bend beginning at a point greater than 1/16th inch from outside of staple leg, according to an illustrative embodiment of the invention.

Referring to FIG. 23, an illustration of a bottom plan view of a right angle bend 20 of the non-metallic insulating material beginning at a point greater than ¹⁄₁₆th inch from the outside surface of staple leg 10 to form a finger grip 1.

Figure 24:
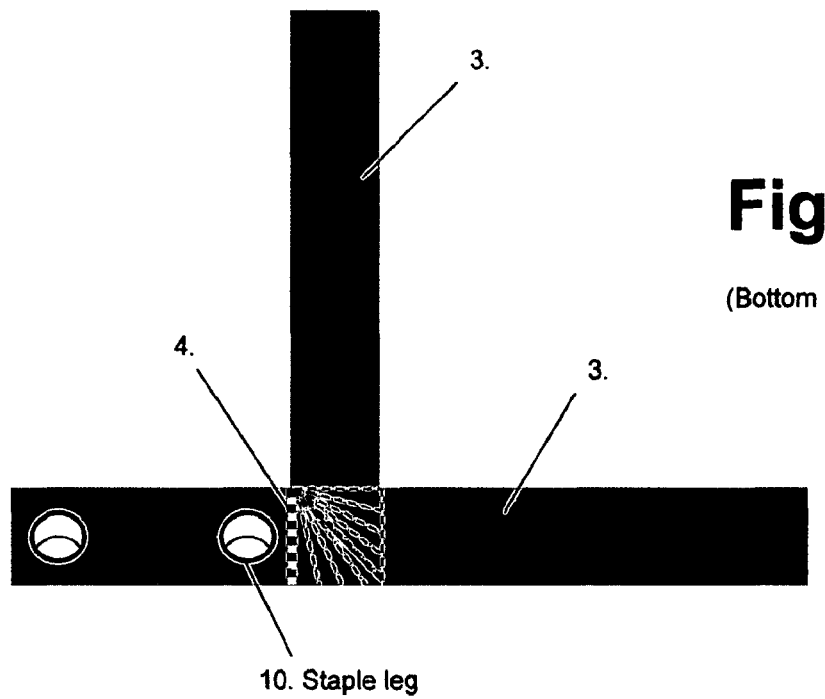
FIG. 24 Bottom plan view illustrating an ornamental variation of multiple finger grips, both of which originate from one side of the staple, according to an illustrative embodiment of the invention.

Referring to FIG. 24, an illustration of a bottom plan view of an embodiment variation showing multiple finger grips 3 and respective finger grip perforation 4 to that of the outside surface of the staple leg 10.

Figure 25:
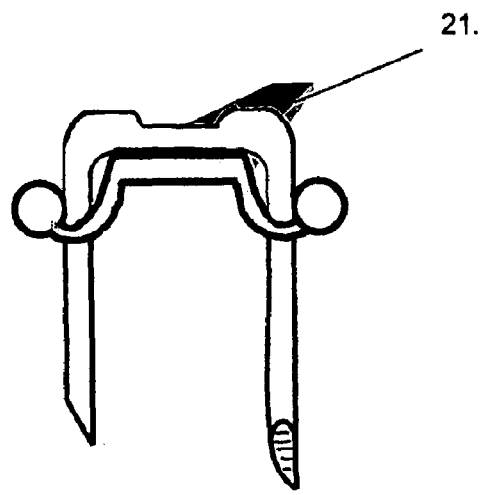
FIG. 25 Front elevation view illustrating finger grip extending from side of central bridging non-metallic insulating material, according to an illustrative embodiment of the invention.

Referring to FIG. 25, an illustration of another preferred embodiment showing a finger grip extension of non-metallic insulating material originating 21 from a central bridging section of the non-metallic insulating material and illustrated to extend behind the staple body member.

Figure 26:
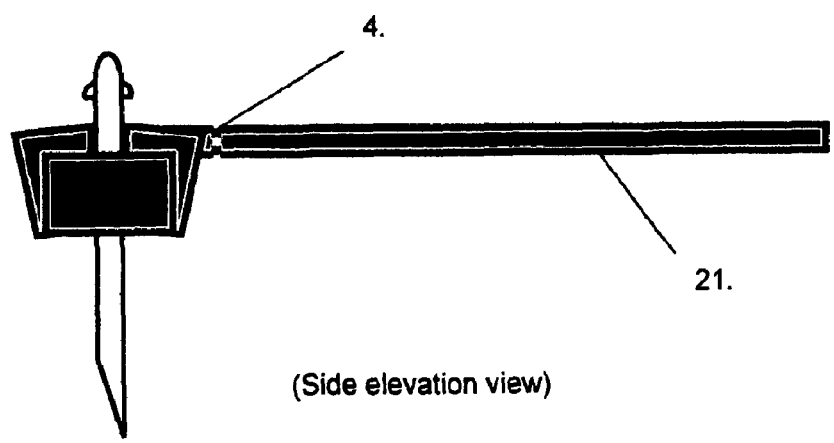
FIG. 26 Side elevation view illustrating finger grip extension of non-metallic insulating material originating from central bridging section of non-metallic insulating material, according to an illustrative embodiment of the invention.

Referring to FIG. 26, an illustration of a side elevation view of the same embodiment variation as is illustrated in FIG. 25 where a finger grip perforation 4 (for removing finger grip following penetration of staple body member into a supporting structure) can be seen on the finger grip extension of the non-metallic insulating material originating 21 from the central bridging section of non-metallic insulating material.

Figure 27:
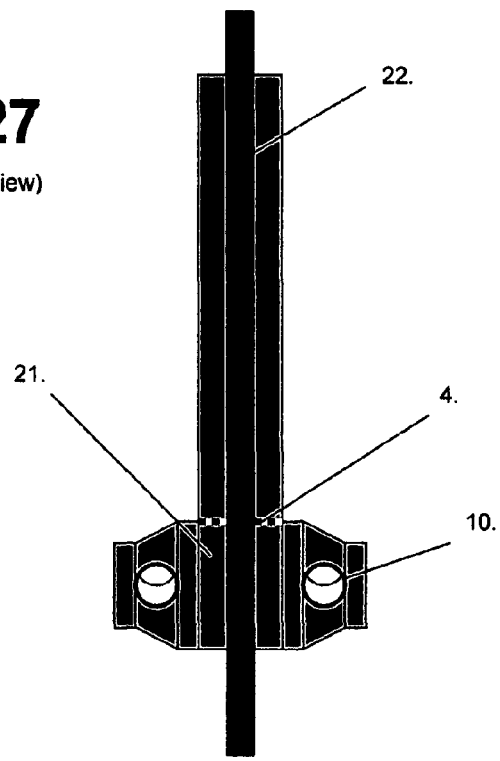
FIG. 27 Bottom plan view illustrating finger grip extension of non-metallic insulating material originating from central bridging section of non-metallic insulating material and positioned above linear object to be captured and anchored onto supportive structure, according to an illustrative embodiment of the invention.

Referring to FIG. 27, an illustration of a bottom plan view of FIG. 25 and FIG. 26 showing how the finger grip extension originating 21 from the central bridging section of the non-metallic insulating material may be held directly over the linear cable, wire, conduit, or conductor 22 to be captured and anchored. This particular embodiment and variation has an additional advantage over side mounted finger grips in that with this variation the person who hammers the staple head may also hold a linear object, such as a length of cable, romex, or insulated wire that is being captured and anchored to a supporting structure in addition to the finger grip of the insulated staple. With this embodiment and variation both finger grip and object to be captured may be jointly held with the same thumb and forefinger.

Additionally, the linear object being captured and anchored is more easily centered under the central bridging section of the non-metallic insulating material below the central body member of the insulated staple. Also illustrated is the location of the finger grip perforation 4 for removal of the finger grip following capture and anchoring of the linear cable, wire, conduit, or conductor 22 by the staple body member and penetration of the staple legs 10 into a supporting member.

Figure 28:
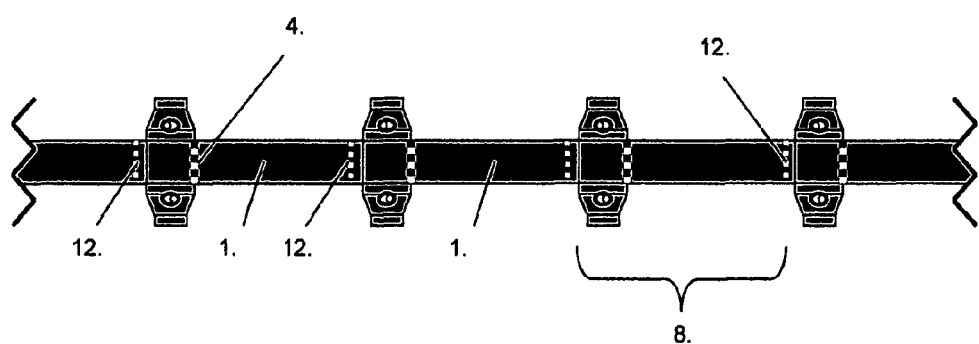
FIG. 28 Bottom plan view illustrating embodiment variation of origin of finger grip within multi-perforated multiple staple unit strip showing location of perforation of nonmetallic insulating material used to separate single-staple-unit from multiple staple unit strip and second perforation used to remove finger grip once staple has been driven into supportive structure, according to an illustrative embodiment of the invention.
Figure 29M:
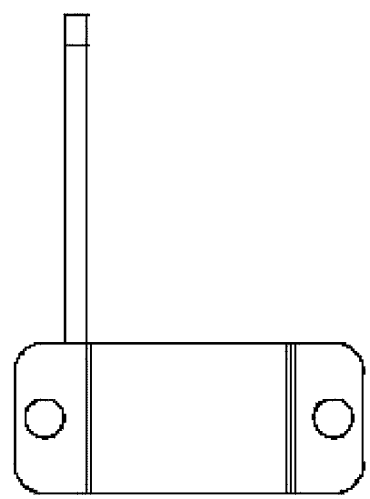

Referring to FIG. 28, a final illustration of a bottom plan view of the preferred embodiment as illustrated in the variation shown in FIG. 25, FIG. 26, and FIG. 27. Note the location and position of a finger grip and finger grips, showing the staple body member being at 90 degrees to the horizontal axis of the finger gripes). This illustration also clearly shows the origin and insertion of the finger gripes) within a multi-perforated multiple staple unit strip. The finger grip 1 originating in this illustration at the central or bridging body member of the non-metallic insulating material and inserting at the beginning of a new single-staple-unit 8.

The location of the perforation or indentation of the non-metallic insulating material used to separate a single-staple-unit from the multiple staple unit strip are shown at 12. A second perforation or indentation used to remove a finger grip 4 is shown and may or may not be used to remove a finger grip once the staple has been driven into a supportive structure. A single-staple-unit perforation 12 or indentation indicates where a single-staple-unit 8 may be removed from a strip or removed from the free end of a multiple staple unit strip. Also shown are the relative locations for the finger grip perforations 4. A single-staple-unit within the multiple staple strip is shown at 8.

In an alternate embodiment, the insulated support 2900, has a finger tab 2902 that is located entirely inside the staple 2904 arch. By forming the structure in this fashion, additional structural rigidity is accomplished, through the formation of an integral arch 2906, said arch having a tab extending from within the arch of said staple to one side 2908, and a significantly similar length wall 2910 on the other. In an alternate environment, the tab 2908 is alternated to the other side of the arch 2906, and or the other side of the staple. In an alternate embodiment, the tab 2908 may extend from the arc top, effectively in a direction that is orthogonal to that of the shown tab 2908.

In an alternate embodiment, the tab 2908 may have one or more angular rotations along its length. Such a rotation would allow for the infinite adjustments to the finger's positions. In addition, the direction of travel of the tab 2908 may be adjusted so that the tab projects away.

To facilitate staple 2904 insertion, one or more openings 2912 are formed in the support 2900. While shown as complete openings, in an alternate embodiment these openings 2912 may be partial, so that they 'snap' into the staple legs without completely surrounding them. In an alternate embodiment, there may be only one opening, with the other side (whether the one having the tab or the other) being a partial opening, or no opening at all.

The support 2900 may be formed of a number of materials. In one embodiment, it is comprised of a material such as plastic (be it a thermoplastic or thermosetting polymer (examples of these include polyethylene, polystyrene, polyvinyl chloride, polypropylene and polytetrafluoroethylene (PTFE))). In an alternate embodiment, it may be comprised of composites, such as carbon composites, metal, wood, bone, paper impregnated with moisture control agents or any composite thereof, or any material capable of supplying a sturdy, stable and cost effective surface.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

Although the invention has been described with reference to these preferred embodiments and variations of same, other embodiments can achieve the same results. Additional variations and modifications of the present invention will be apparent to one skilled in the art and the following claims are intended to cover all such modifications and equivalents.

The invention claimed is:

1. An insulating device for securing conductors comprising;
   a staple with a metallic body having a plurality of leg portions connected by a bridge portion
   an elongated single-thickness strip of material pierced by at least one leg of said staple;
   said strip of material spanning the inner section of said staple's bridge, said strip of material being aligned with said bridge; and
   one or more tabs extending from the portion of said strip of material located within said staple bridge portion, wherein said tab comprises a generally planar portion parallel to the axis of said leg extending perpendicular to said bridge axis beyond said bridge of the staple by a distance longer than that of half the staple bridge span.

2. The insulating device of claim 1, wherein;
   said strip of material is comprised of plastic.

3. A method for creating a device for securing conductors comprising;
   providing a staple with a metallic body having a plurality of leg portions connected by a bridge portion
   providing an elongated single-thickness strip of material pierced by at least one leg of said staple, said strip of material spanning the inner section of said staple's bridge and being aligned with said bridge and having one or more tabs extending from the portion of said strip of material located within said staple bridge portion, wherein said tab comprises a generally planar portion parallel to the axis of said leg extending perpendicular to said bridge axis beyond said bridge of the staple by a distance longer than that of half the staple bridge span.

4. The method of claim 3, wherein;
   said strip of material is comprised of plastic.

* * * * *